United States Patent
Lehotkay et al.

(10) Patent No.: US 11,845,914 B2
(45) Date of Patent: Dec. 19, 2023

(54) SILICONE COPOLYMERS PRODUCTION THEREOF AND USE THEREOF FOR TREATMENT OF FIBROUS SUBSTRATES

(71) Applicant: WACKER CHEMIE AG, Munich (DE)

(72) Inventors: Thomas Lehotkay, Muehldorf (DE); Walter Eichberger, Kirchberg (AT); Oliver Schaefer, Burghausen (DE); Inge Seeger-Feichtinger, Kirchdorf am Inn (DE)

(73) Assignee: Wacker Chemie AG, Munich (DE)

( * ) Notice: Subject to any disclaimer, the term of this patent is extended or adjusted under 35 U.S.C. 154(b) by 681 days.

(21) Appl. No.: 16/772,970

(22) PCT Filed: Dec. 13, 2017

(86) PCT No.: PCT/EP2017/082682
§ 371 (c)(1),
(2) Date: Jun. 15, 2020

(87) PCT Pub. No.: WO2019/114953
PCT Pub. Date: Jun. 20, 2019

(65) Prior Publication Data
US 2021/0171875 A1    Jun. 10, 2021

(51) Int. Cl.
| | |
|---|---|
| *C11D 9/36* | (2006.01) |
| *C11D 3/37* | (2006.01) |
| *C08G 77/455* | (2006.01) |
| *C11D 3/00* | (2006.01) |
| *D06M 15/643* | (2006.01) |
| *D06M 101/06* | (2006.01) |
| *D06M 101/32* | (2006.01) |

(52) U.S. Cl.
CPC .......... *C11D 3/3742* (2013.01); *C08G 77/455* (2013.01); *C11D 3/0015* (2013.01); *D06M 15/6436* (2013.01); *D06M 2101/06* (2013.01); *D06M 2101/32* (2013.01); *D06M 2200/25* (2013.01); *D06M 2200/50* (2013.01)

(58) Field of Classification Search
CPC ........ C11D 9/36; C11D 3/373; C11D 11/0017
See application file for complete search history.

(56) References Cited

U.S. PATENT DOCUMENTS

| | | |
|---|---|---|
| 5,001,210 A | 3/1991 | Coury et al. |
| 7,501,184 B2 * | 3/2009 | Leir .......................... B32B 7/12 428/447 |
| 8,552,136 B2 | 10/2013 | Papp et al. |
| 2002/0035186 A1 | 3/2002 | Ona et al. |
| 2003/0032726 A1 | 2/2003 | Shores |
| 2008/0075683 A1 | 3/2008 | Herzig et al. |
| 2008/0318065 A1 | 12/2008 | Sherman et al. |
| 2013/0011673 A1 * | 1/2013 | Hansen ................ C08G 65/007 528/33 |
| 2013/0012667 A1 * | 1/2013 | Hansen .................. C08L 83/04 528/36 |

FOREIGN PATENT DOCUMENTS

| | | |
|---|---|---|
| DE | 19652524 A1 | 6/1998 |
| WO | 2017182061 A1 | 10/2017 |

* cited by examiner

*Primary Examiner* — Charles I Boyer
(74) *Attorney, Agent, or Firm* — BROOKS KUSHMAN P.C.

(57) ABSTRACT

Low molecular weight silicone copolymers prepared by reacting an oxamido ester-terminated silicone with a polyetheramine and a primary or secondary amine are useful in treating fabrics to obtain a soft hand and also hydrophilicity, and can be prepared without the use of highly toxic reagents.

7 Claims, No Drawings

SILICONE COPOLYMERS PRODUCTION THEREOF AND USE THEREOF FOR TREATMENT OF FIBROUS SUBSTRATES

CROSS REFERENCE TO RELATED APPLICATIONS

This application is the U.S. National Phase of PCT Appln. No. PCT/EP2017/082682, filed Dec. 13, 2017, the disclosure of which is incorporated in its entirety by reference herein.

BACKGROUND OF THE INVENTION

1. Field of the Invention

The invention relates to silicone copolymers, to their preparation, and to their use for treating fibrous substrates.

2. Description of the Related Art

Modern, silicone-containing softeners for imparting water repellency to fibers consist primarily of functional silicone oils which comprise, for example, hydrophilic groups or quaternary ammonium groups, as known from DE 19652524 A1, for example. The quaternary products are usually not water-soluble, and have to be brought into an aqueous applicable form by additional emulsification, whereas the hydrophilically modified siloxanes are partially water-dispersible. The latter, however, by comparison with conventional amino-functional siloxanes, have poorer softening qualities.

Siloxane copolymers, as in U.S. Pat. No. 5,001,210 A, US 2003/0032726 A1 and US 2008/0075683 A1, where the amino groups are combined with hydrophilic groups, display the disadvantage of being necessarily prepared in multistage synthesis steps. In these syntheses, in some cases, toxic intermediates such as isocyanates and their derivatives are used or are obtained as intermediates, or costly and inconvenient hydrosilylation steps are needed. The hydrophilic products, furthermore, are not laundering-resistant, nor can they be imparted with such a property in an economical way. In some cases, furthermore, they exhibit an interfering intrinsic color.

U.S. Pat. No. 7,501,184 describes copolymers which are obtained by reaction of linear organopolysiloxanes terminated with oxamidoester groups, with organic diamines. The copolymers obtained, which have a high viscosity or are solid, are used in adhesives, especially as hotmelt adhesives. These high-viscosity products are not stably emulsifiable and therefore cannot be integrated into a textile treatment chain.

The object was to provide silicone copolymers and emulsions thereof that do not have the above-stated disadvantages, can be prepared without toxic substances such as isocyanates, and can be used to finish fibrous substrates, especially textiles, fibers, leather and hair, so as to endow them with good soft-hand and hydrophilicity qualities. The object is achieved through the invention.

SUMMARY OF THE INVENTION

It has now been discovered that low molecular weight silicon copolymers having excellent fiber finishing properties can be prepared without the use of a toxic reagents, while providing a soft hand and good hydrophilicity.

DETAILED DESCRIPTION OF THE PREFERRED EMBODIMENTS

A subject of the invention is a method for treating fibrous substrates with compositions comprising silicone copolymers (A) of the formula (I)

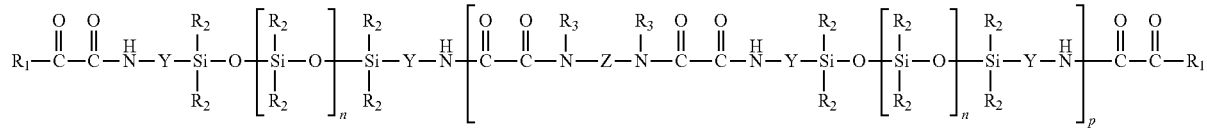

where
- Y is identical or different and denotes a divalent hydrocarbon radical which has 1 to 20 carbon atoms and may comprise one or more heteroatoms, preferably oxygen or nitrogen atoms,
- Z is identical or different and denotes an organic radical which contains a polyoxyalkylene group and is divalent, preferably a radical of the formula $-(R^6O)_w-R^7-$,
- $R^1$ is identical or different and is a radical of the formula $-N(R^4)-R^5$ (IV') or $-O-R^5$ (V'), preferably a radical of the formula $-N(R^4)-R^5$ (IV'),
- $R^2$ is identical or different and denotes a monovalent hydrocarbon radical which has 1 to 18 carbon atoms and may comprise halogen or oxygen atoms,
- $R^3$ is identical or different and is a hydrogen atom or a monovalent hydrocarbon radical having 1 to 20 carbon atoms,
- $R^4$ denotes a hydrogen atom, a $C_{1-18}$ alkyl radical or a hydrocarbon radical which has 4 to 18 carbon atoms and comprises one or more oxygen or nitrogen atoms, and
- $R^5$ denotes a $C_{1-18}$ alkyl radical or a hydrocarbon radical which has 4 to 18 carbon atoms and comprises one or more oxygen or nitrogen atoms,
  or $R^4$ and $R^5$ in formula (IV') together denote a divalent hydrocarbon radical which may comprise one or more oxygen or nitrogen atoms,
- $R^6$ is identical or different and denotes a $C_1$-$C_{10}$ alkylene radical, preferably a $C_2$-$C_3$ alkylene radical, more preferably ethylene or isopropylene radical, and
- $R^7$ denotes a $C_1$-$C_{10}$ alkylene radical, preferably a $C_2$-$C_3$ alkylene radical, more preferably an ethylene or isopropylene radical,
- n is an integer from 10 to 2000, preferably 10 to 300,
- p is an integer from 1 to 5, preferably 1 to 2, more preferably 1, and
- w is on average 2.5 to 80, preferably 10 to 30.

A further subject of the invention are silicone copolymers (A) of the formula (I)

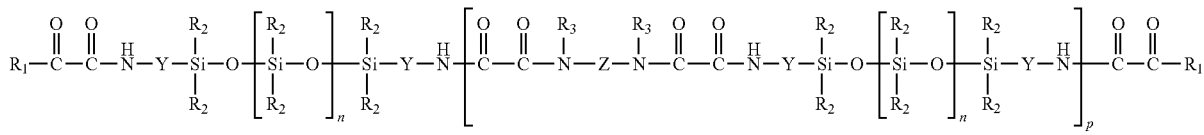

where
Y, Z, $R^1$, $R^2$, $R^3$, $R^4$, $R^5$, $R^6$, $R^7$, n, p and w have the definition indicated for them above.

A further subject of the invention is a process for preparing the silicone copolymers, wherein (1) organopolysiloxanes terminated with oxamidoester groups, of the formula (II)

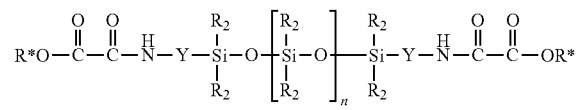

where $R^2$, Y and n have the definition indicated for them above and
R* is a monovalent hydrocarbon radical having 1 to 18 carbon atoms, or is a radical $R^5$, where $R^5$ has the definition indicated for it above,
are reacted with (2) polyetheramines of the formula $$R^3HN—Z—NHR^3 \quad (III),$$

where $R^3$ and Z have the definition indicated for them above, and with (3) primary or secondary amines of the formula

$$H—N(R^4)—R^5 \quad (IV)$$

or alcohols of the formula $H—O—R^5$ (V), where $R^4$ and $R^5$ have the definition indicated for them above.

The silicone copolymers of the invention differ from the high molecular weight copolymers described in U.S. Pat. No. 7,501,184 in having a much lower molecular weight. The silicone copolymers preferably have a molecular weight Mn (number average) of 4000-30,000 g/mol. This number-average molecular weight Mn is preferably determined for the purposes of the present invention preferably by size exclusion chromatography (SEC). The number-average molecular weight Mn is determined more preferably by size exclusion chromatography (SEC) against polystyrene standard, in THF, at 60° C., flow rate 1.2 ml/min, and detection by RI (refractive index detector) on a Styragel HR3-HR4-HR5-HR5 column set from Waters Corp. USA, with an injection volume of 100 μl.

Examples of the radical Y are divalent hydrocarbon radicals such as the methylene group, the 1,2-ethylene group, the 1,3-propylene group, the 1,3-butylene group, the 1,4-butylene group, the 1,5-pentylene group, and the 1,6-hexylene group. Further examples of the radical Y are alkylene radicals which contain one or more heteroatoms, such as, for example, the —$C_2H_4$—NH—$C_3H_6$— group.

A preferred example is the 1,3-propylene group.

Examples of the radical Z are divalent hydrocarbonoxy radicals, such as the polyethylene glycol radicals or polypropylene glycol radicals or mixtures of polyethene glycol and polypropylene glycol radicals. The radical Z preferably has a molecular weight of 120 g/mol to 4500 g/mol, very preferably a molecular weight of 500 g/mol to 1800 g/mol.

Examples of radicals $R^2$ are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl and methylcyclohexyl radicals; alkenyl radicals such as the vinyl, 5-hexenyl, cyclohexenyl, 1-propenyl, allyl, 3-butenyl and 4-pentenyl radicals; alkynyl radicals such as the ethynyl, propargyl and 1-propynyl radicals; aryl radicals such as the phenyl, naphthyl, anthryl and phenanthryl radical; alkaryl radicals such as the o-, m- and p-tolyl radicals, xylyl radicals and ethylphenyl radicals; and aralkyl radicals such as the benzyl radical, and the α- and the β-phenylethyl radical.

A preferred example of the radical $R^2$ is the methyl radical.

The above-stated radicals $R^2$ may also comprise one or more halogen atoms, or oxygen atoms.

Examples of hydrocarbon radicals $R^2$ are also valid for hydrocarbon radicals $R^3$. Preferably $R^3$ is a hydrogen atom or a $C_1$-$C_6$ alkyl radical, more preferably a hydrogen atom.

The radical $R^1$ of the formula —$N(R^4)$—$R^5$ (IV') originates from a primary or secondary amine of the formula H—$N(R^4)$—$R^5$ (IV) minus the H atom bonded on the nitrogen atom.

The radical $R^1$ of the formula —O—$R^5$ (V') originates from an alcohol of the formula H—O—$R^5$ (V) minus the H atom bonded on the oxygen atom.

The radicals $R^4$ and $R^5$ in the radical $R^1$ may be identical or different $C_1$-$C_{18}$ alkyl radicals. These examples of $C_1$-$C_{18}$ alkyl radicals $R^2$ are also valid for $C_1$-$C_{18}$ alkyl radicals $R^4$ and $R^5$. $R^4$ and $R^5$ in formula (IV') may simultaneously be part of a cyclic radical.

The radicals $R^4$ and $R^5$ in the radical $R^1$ may also denote a hydrocarbon radical having 4 to 18 carbon atoms and preferably comprising at least one nitrogen or oxygen heteroatom. $R^4$ and $R^5$ in this case in formula (IV') may simultaneously be part of a heterocyclic radical.

Examples of such radicals $R^4$ and $R^5$ are radicals of the formula —$(CH_2)_3$—$N(CH_3)_2$, —$(CH_2)_3$—$OCH_2CH_3$ and —$(CH_2)_2$—$OCH_2CH_3$.

Preferred examples of amines of the formula H—N(R$^4$)—R$^5$ (IV) are primary amines, such as

H—NH—(CH$_2$)$_3$—N(CH$_3$)$_2$ (N$^1$,N$^1$-dimethylpropane-1,3-diamine)
and secondary amines, such as

H—N—[(CH$_2$)$_3$—N(CH$_3$)$_2$]$_2$ (N$^1$-(3-(dimethylamino) propyl)-N$^3$,N$^3$-dimethylpropane-1,3-diamine)
primary polyetheramines such as

H—NH—(CH$_2$)$_3$—OCH$_2$CH$_3$, H—NH—(CH$_2$)$_2$—OCH$_2$CH$_3$, secondary polyetheramines such as

NH—[(CH$_2$)$_3$—OCH$_2$CH$_3$]$_2$, NH—[(CH$_2$)$_2$—OCH$_2$CH$_3$]$_2$.

The preferred radicals R$^1$ here correspond to the above-stated amines minus one H atom bonded on the nitrogen atom N, or to the above-stated alcohols minus one O atom bonded on the oxygen atom O,
and hence preferred radicals R$^1$ are those of the formula —NH—(CH$_2$)$_3$—N(CH$_3$)$_2$ and NH—(CH$_2$)$_3$—OCH$_2$CH$_3$ —N—[(CH$_2$)$_3$—N(CH$_3$)$_2$]$_2$ and —N—[(CH$_2$)$_3$—OCH$_2$CH$_3$]$_2$.

The compositions of the invention with which the fibrous substrates are treated may be solutions of silicone copolymers (A) of the invention in organic solvents.

The compositions of the invention with which the fibrous substrates are treated are preferably
aqueous emulsions comprising
silicone copolymers (A) of the invention,
emulsifiers (B) and/or coemulsifiers (B'), and
water (C).

A subject of the invention, therefore, are aqueous emulsions comprising
silicone copolymers (A) of the invention,
emulsifiers (B) and/or coemulsifiers (B'), and
water (C).

Emulsifiers (B) used may be nonionic, anionic or cationic emulsifiers or else mixtures thereof.
The aqueous emulsions of the invention comprise emulsifiers that are known per se, and mixtures thereof.
Particularly suitable anionic emulsifiers include:
1. Alkyl sulfates, particularly those having a chain length of 8 to 18 carbon atoms, alkyl and alkaryl ether sulfates having 8 to 18 carbon atoms in the hydrophobic radical and 1 to 40 ethylene oxide (EO) and/or propylene oxide (PO) units.
2. Sulfonates, particularly alkylsulfonates having 8 to 18 carbon atoms, alkylarylsulfonates having 8 to 18 carbon atoms, taurides, esters and monoesters of sulfosuccinic acid with monohydric alcohols or alkylphenols having 4 to 15 carbon atoms; these alcohols or alkylphenols may optionally also be ethoxylated with 1 to 40 EO units.
3. Alkali metal salts and ammonium salts of carboxylic acids having 8 to 20 carbon atoms in the alkyl, aryl, alkaryl or aralkyl radical.
4. Phosphoric acid partial esters and their alkali metal and ammonium salts, particularly alkyl and alkaryl phosphates having 8 to 20 carbon atoms in the organic radical, alkyl ether and alkaryl ether phosphates having 8 to 20 carbon atoms in the alkyl or alkaryl radical, respectively, and 1 to 40 EO units.

Particularly suitable nonionic monomers include:
5. Polyvinyl alcohol additionally having 5 to 50%, preferably 8 to 20%, of vinyl acetate units, with a degree of polymerization of 500 to 3000.
6. Alkyl polyglycol ethers, preferably those having 8 to 40 EO units and alkyl radicals of 8 to 20 carbon atoms.
7. Alkyl aryl polyglycol ethers, preferably those having 8 to 40 EO units and 8 to 20 carbon atoms in the alkyl and aryl radicals.
8. Ethylene oxide/propylene oxide (EO/PO) block copolymers, preferably those having 8 to 40 EO and PO units.
9. Adducts of alkylamines having alkyl radicals of 8 to 22 carbon atoms with ethylene oxide or propylene oxide.
10. Fatty acids having 6 to 24 carbon atoms.
11. Alkyl polyglycosides of the general formula R*—O—Z$_O$, in which R* denotes a linear or branched, saturated or unsaturated alkyl radical having on average 8-24 carbon atoms and Z$_O$ denotes an oligoglycoside radical having on average o=1-10 hexose or pentose units or mixtures thereof.
12. Natural substances and their derivatives, such as lecithin, lanolin, saponins, cellulose; cellulose alkyl ethers and carboxyalkyl celluloses in which the alkyl groups each possess up to 4 carbon atoms.
13. Linear organo(poly)siloxanes containing polar groups, especially those with alkoxy groups having up to 24 carbon atoms and/or up to 40 EO and/or PO groups.

Particularly suitable cationic emulsifiers include:
14. Salts of primary, secondary, and tertiary fatty amines having 8 to 24 carbon atoms with acetic acid, sulfuric acid, hydrochloric acid, and phosphoric acids.
15. Quaternary alkylammonium and alkylbenzeneammonium salts, more particularly those whose alkyl groups possess 6 to 24 carbon atoms, especially the halides, sulfates, phosphates, and acetates.
16. Alkylpyridinium, alkylimidazolinium and alkyloxazolinium salts, more particularly those whose alkyl chain possesses up to 18 carbon atoms, especially the halides, sulfates, phosphates, and acetates.

Particularly suitable ampholytic emulsifiers include:
17. Amino acids with long-chain substitution, such as N-alkyl-di(aminoethyl)glycine or salts of N-alkyl-2-aminopropionic acid.
18. Betaines, such as N-(3-acylamidopropyl)-N,N-dimethylammonium salts having a C$_8$-C$_{18}$ acyl radical, and alkylimidazolium betaines.

Preferred emulsifiers are nonionic emulsifiers, especially the alkyl polyglycol ethers listed above under 6., the adducts of alkylamines with ethylene oxide or propylene oxide, listed under 9., the alkyl polyglycosides listed under 11., and the polyvinyl alcohols listed under 5.

Emulsifiers are used here in amounts of 1 wt % to 70 wt %, based on the total weight of the aqueous emulsions.

The aqueous emulsions comprise copolymers (A) of the invention preferably in amounts of 0.5 wt % to 80 wt %, based on the total weight of the aqueous emulsions.

The aqueous emulsions of the invention may also comprise further substances such as polyethylene glycols, polypropylene glycols and polyethylene-polypropylene glycols and mixtures thereof, and also acids. Examples of acids are carboxylic acids such as acetic acid, formic acid, citric acid, malic acid and lactic acid.

Further substances that may be present in the aqueous emulsions of the invention include solvents or coemulsifiers (B'). Examples of nonaqueous solvents or coemulsifiers are 1-pentanol, 1-hexanol, 1-octanol, propanediol, 1,3-butanediol, 1,2-hexanediol, 2-ethylhexane-1,3-diol, 1,2-octanediol, glycerol, diethylene glycol methyl ether, diethylene glycol ethyl ether, diethylene glycol mono-n-butyl ether, and propylene glycol methyl ether.

The oxamido ester-group-terminated organopolysiloxanes (1) of the formula (II) that are used in the process of the invention may be prepared by the processes described in U.S. Pat. No. 7,501,184 B2 (incorporated by reference), especially column 13, lines 14 to 48. The skilled person is also aware of other processes.

Examples of the polyetheramines (2) used in the process of the invention are Jeffamine® diamines of series D and ED, available commercially from Huntsman, such as Jeffamine® D-230, Jeffamine® D-400, Jeffamine® D-2000, Jeffamine® HK 511, Jeffamine® ED-600, Jeffamine® ED-900 and Jeffamine® ED-2003.

The process of the invention preferably uses polyetheramines (2) in amounts of 0.3 to 0.8 mol, more preferably 0.4 to 0.6, most preferably 0.5 mol of amino group in (2) per mole of oxamidoester group in organopolysiloxane (1).

The process of the invention preferably uses primary or secondary amines of the formula (IV) as component (3).

The process of the invention preferably uses primary or secondary amines (3) in amounts of 0.2 to 0.7 mol, more preferably 0.4 to 0.6 mol, most preferably 0.5 mol of amino group in (3) per mole of oxamidoester group in organopolysiloxane (1).

Preferably the oxamidoester groups present in organopolysiloxane (1) are reacted to an extent of at least 80%, more preferably at least 90%, most preferably at least 95% with the amino groups that are present in (2) and (3).

In the process of the invention, the organopolysiloxanes (1) terminated with oxamidoester groups are preferably introduced initially, and the polyetheramines (2) and the amines (3) can be added together, or the amines (3) can first be added and then the polyetheramines (2), or the polyetheramines (2) can first be added and then the amines (3). Preference is given to adding first the amines (3) and subsequently the polyetheramines (2).

The alcohol formed in the reaction is preferably removed, preferably by distillation.

The process of the invention for preparing the silicone copolymers (A) is preferably carried out at temperatures from 0° C. to 100° C., more preferably 15° C. to 60° C. The process of the invention is preferably carried out under the pressure of the surrounding atmosphere, such as at about 1020 hPa, although it may also be carried out at higher or lower pressures.

The process of the invention for preparing the silicone copolymers (A) may be carried out batchwise, semibatchwise, or continuously.

Examples of fibrous substrates which are treated with the compositions comprising the silicone copolymers (A) of the invention are natural or synthetically produced fibers, yarns, skeins, cables, sheetlike textile structures such as nonwovens, mats, woven, knotted or knitted textiles, leather and leatherette, and also hairs. Preferred fibrous substrates are textiles. For application of the composition of the invention, the textiles may take the form of individual fibers, fiber bundles, fiberfill fibers, yarns, carpets, fabric webs, or garments or parts of garments.

The textiles may consist of cotton, wool, copolymers of vinyl acetate, rayon, hemp, natural silk, polypropylene, polyethylene, polyester, polyurethane, polyamide, aramid, polyimide, polyacrylate, polyacrylonitrile, polylactide, polyvinyl chloride, glass fibers, ceramic fibers, cellulose or mixtures thereof.

Application to the fibrous substrates to be treated, preferably textiles, may take place in any desired manner which is suitable and widely known for the treatment of fibrous substrates, such as textiles—for example, by dipping, spreading, casting, spraying, rolling, padding, printing or foam application.

In the application, the composition of the invention may be combined with commonplace textile auxiliaries, such as, for example, binders comprising melamine resins or methylol resins, polyethylenes, polyurethanes, polyacrylates, polyvinyl alcohols, polyvinyl acetates, optical brighteners, flatting agents, electrolytes, wetting assistants, plastic resins, bleaches, antistats, dispersions of metal oxides, silicates, perfume oils, dyes and preservatives, defoamers or further hydrophobizing and oleophobizing assistants, such as perfluorinated hydrocarbons.

The products of the invention, furthermore, may be used with fabric softeners based on polysiloxanes and organic softeners such as anionic, cationic and nonionic softeners, and mixtures thereof.

These include functional and nonfunctional silicones, salts of the metal soaps, alkylpolysulfonates, sulfosuccinates and derivatives thereof, ester quats, sulfoalkylene fatty acid amides, alkylammonium sulfates, triethanolamine fatty acid esters, fatty acid polyglycol esters, fatty amine polyalkylene adducts, fatty acid amide polyalkylene adducts, and dispersions of paraffins, waxes, polyethylenes and polyesters.

The fibrous substrates treated, preferably textiles, are left to dry preferably at temperatures of 20° C. to 200° C., more preferably 100° C. to 180° C.

The silicone copolymers (A) of the invention, and the compositions comprising the silicone copolymers (A) of the invention, have the advantage that the fibrous substrates treated with them, such as textiles, are hydrophilic, have a soft hand, and are easily emulsifiable.

In the examples described below, all references to parts and percentages, unless otherwise indicated, are by weight.

Moreover, all viscosity references are based on a temperature of 25° C. Unless otherwise indicated, the examples below are carried out at a pressure of the surrounding atmosphere, in other words about 1010 hPa, and at room temperature, in other words at about 20° C., or at a temperature which comes about when the reactants are combined at room temperature without additional heating or cooling.

Hereinafter:

Me stands for methyl radical and

Et stands for ethyl radical,

TA 187=$N^1$-(3-(dimethylamino) propyl)-$N^3,N^3$-dimethylpropane-1,3-diamine (available commercially from SIGMA-ALDRICH, MERCK, Darmstadt, Germany)

DA 102=$N^1,N^1$-dimethylpropane-1,3-diamine (available commercially from SIGMA-ALDRICH, MERCK, Darmstadt, Germany)

Example 1 (Preparation of Copolymer P1)

A 500 ml 3-neck flask with thermocouple, KPG stirrer and reflux condenser was charged with 100 g (20 mmol) of oxamidoester-terminated silicone oil (5065 g/mol). At 22° C., with stirring and over the course of 10 minutes, 3.74 g (20 mmol) of TA 187 and subsequently 6.6 g (10 mmol) of JEFFAMINE® ED-600 (available from Huntsman Performance Products, Everslaan 45, B-3078 Everberg, Belgium)

were added. This was followed by stirring for 30 minutes more. Thereafter the reaction product was freed from the resultant alcohol at 40° C. and a pressure of 20 hPa. This gave 107 g of an opaque, oligomeric product P1 having a molecular weight as determined by SEC of 13,857 g/mol.

Example 2 (Preparation of Copolymer P2)

A 1000 ml 3-neck flask with thermocouple, KPG stirrer and reflux condenser was charged with 474 g (60 mmol) of oxamidoester-terminated silicone oil (7923 g/mol). At 22° C., with stirring and over the course of 10 minutes, 11.22 g (60 mmol) of TA 187 and subsequently 19.8 g (30 mmol) of JEFFAMINE® ED-600 were added. This was followed by stirring for 30 minutes more. Thereafter the reaction product was freed from the resultant alcohol at 40° C. and a pressure of 20 hPa. This gave 502 g of an opaque, oligomeric product P2 having a molecular weight as determined by SEC of 20,050 g/mol.

Example 3 (Preparation of Copolymer P3)

A 500 ml 3-neck flask with thermocouple, KPG stirrer and reflux condenser was charged with 105 g (20 mmol) of oxamidoester-terminated silicone oil (5175 g/mol). At 22° C., with stirring and over the course of 10 minutes, 2.04 g (20 mmol) of DA 102 and subsequently 6.6 g (10 mmol) of JEFFAMINE® ED-600 were added. This was followed by stirring for 30 minutes more. Thereafter the reaction product was freed from the resultant alcohol at 40° C. and a pressure of 20 hPa. This gave 111 g of a clear, oligomeric product P3 having a molecular weight as determined by SEC of 11,690 g/mol.

Example 4 (Preparation of Copolymer P4)

A 500 ml 3-neck flask with thermocouple, KPG stirrer and reflux condenser was charged with 158 g (20 mmol) of oxamidoester-terminated silicone oil (7923 g/mol). At 22° C., with stirring and over the course of 10 minutes, 3.74 g (20 mmol) of TA 187 and subsequently 9.0 g (10 mmol) of JEFFAMINE® ED-900 (available from Huntsman Performance Products, Everslaan 45, B-3078 Everberg, Belgium) were added. This was followed by stirring for 30 minutes more. Thereafter the reaction product was freed from the resultant alcohol at 40° C. and a pressure of 20 hPa. This gave 169 g of a clear, oligomeric product P4 having a molecular weight as determined by SEC of 14,676 g/mol.

Example 5 (Preparation of Copolymer P5)

A 500 ml 3-neck flask with thermocouple, KPG stirrer and reflux condenser was charged with 100 g (19 mmol) of oxamidoester-terminated silicone oil (5175 g/mol). At 22° C., with stirring and over the course of 10 minutes, 3.61 g (19 mmol) of TA 187 and subsequently 8.7 g (9.6 mmol) of JEFFAMINE® ED-900 were added. This was followed by stirring for 30 minutes more. Thereafter the reaction product was freed from the resultant alcohol at 40° C. and a pressure of 20 hPa. This gave 108 g of an opaque, oligomeric product P5 having a molecular weight as determined by SEC of 11,201 g/mol.

Example 6a (Preparation of Copolymer P6a)

A 500 ml 3-neck flask with thermocouple, KPG stirrer and reflux condenser was charged with 100 g (19 mmol) of oxamidoester-terminated silicone oil (5175 g/mol). At 22° C., with stirring and over the course of 10 minutes, 1.94 g (19 mmol) of DA 102 and subsequently 8.7 g (9.6 mmol) of JEFFAMINE® ED-900 were added. This was followed by stirring for 30 minutes more.

Thereafter the reaction product was freed from the resultant alcohol at 40° C. and a pressure of 20 hPa. This gave 108 g of a clear, oligomeric product P6a having a molecular weight as determined by SEC of 11,201 g/mol.

Example 6b (Preparation of Copolymer P6b)

A 500 ml 3-neck flask with thermocouple, KPG stirrer and reflux condenser was charged with 100 g (19 mmol) of oxamidoester-terminated silicone oil (5175 g/mol). At 22° C., with stirring and over the course of 10 minutes, 8.7 g (9.6 mmol) of JEFFAMINE® ED-900 and then 1.94 g (19 mmol) of DA 102 were added. This was followed by stirring for 30 minutes more. Thereafter the reaction product was freed from the resultant alcohol at 40° C. and a pressure of 20 hPa. This gave 109 g of an opaque, oligomeric product P6b having a molecular weight as determined by SEC of 12,461 g/mol.

The molar ratios of the reactants used when preparing the silicone copolymers, and also the molecular weight Mn of the resulting silicone copolymers P1 to P5 and their appearance, are summarized for examples 1 to 5 in table 1.

TABLE 1

| Copolymer | Silicone oxalate oil Mn in [g/mol] | | JEFFAMINE® | | Amine stopper | | Mn in [g/mol] | Appearance |
|---|---|---|---|---|---|---|---|---|
| | 5000 | 8000 | ED-600 | ED-900 | TA 187 | DA 102 | | |
| P1 | 2 | | 1 | | 2 | | 13,857 | opaque |
| P2 | | 2 | 1 | | 2 | | 20,050 | opaque |
| P3 | 2 | | 1 | | | 2 | 11,690 | clear |
| P4 | | 2 | | 1 | 2 | | 14,676 | clear |
| P5 | 2 | | | 1 | 2 | | 11,201 | opaque |

Example 8 (Comparative Experiment)

WACKER FINISH CT 78 E is a macroemulsion of an amino-functional silicone oil (available from WACKER CHEMIE AG, Munich, Germany) with a solids content of 40%.

The amount used, indicated in table 3, is prepared by dilution with water and is adjusted to a pH of 4.5 with acetic acid, 80% (available from Brenntag GmbH, Munich, Germany) and applied using a pad mangle (MATHIS AG, Oberhasli, Switzerland) to a knitted cotton fabric and to a woven cotton/polyester blend fabric in accordance with the details from table 1.

Example 9

21.2 g of P1 are mixed into 4.7 g of diethylene glycol monobutyl ether (available from Sigma-Aldrich Chemie GmbH, Taufkirchen, Germany) and 4.1 g of tridecyl alcohol ethoxylate (available as LUTENSOL® TO from BASF SE, Ludwigshafen) and the mixture is then slowly diluted with 70.0 g of water and adjusted to a pH of 4.5 with acetic acid, 80%.

The amount for use as indicated in table 3 is prepared by dilution with water and applied with a pad mangle to a knitted cotton fabric and to a woven cotton/polyester blend fabric in accordance with the details from table 2.

Example 10

21.2 g of P2 are mixed into 4.7 g of diethylene glycol monobutyl ether and 4.1 g of tridecyl alcohol ethoxylate and the mixture is then slowly diluted with 70.0 g of water and adjusted to a pH of 4.5 with acetic acid, 80%.

The amount for use as indicated in table 3 is prepared by dilution with water and applied with a pad mangle to a knitted cotton fabric and to a woven cotton/polyester blend fabric in accordance with the details from table 2.

Example 11

21.2 g of P3 are mixed into 4.7 g of diethylene glycol monobutyl ether and 4.1 g of tridecyl alcohol ethoxylate and the mixture is then slowly diluted with 70.0 g of water and adjusted to a pH of 4.5 with acetic acid, 80%.

The amount for use as indicated in table 3 is prepared by dilution with water and applied with a pad mangle to a knitted cotton fabric and to a woven cotton/polyester blend fabric in accordance with the details from table 2.

Example 12

21.2 g of P4 are mixed into 4.7 g of diethylene glycol monobutyl ether and 4.1 g of tridecyl alcohol ethoxylate and the mixture is then slowly diluted with 70.0 g of water and adjusted to a pH of 4.5 with acetic acid, 80%.

The amount for use as indicated in table 3 is prepared by dilution with water and applied with a pad mangle to a knitted cotton fabric and to a woven cotton/polyester blend fabric in accordance with the details from table 2.

Example 13

21.2 g of P5 are mixed into 4.7 g of diethylene glycol monobutyl ether and 4.1 g of tridecyl alcohol ethoxylate and the mixture is then slowly diluted with 70.0 g of water and adjusted to a pH of 4.5 with acetic acid, 80%.

The amount for use as indicated in table 3 is prepared by dilution with water and applied with a pad mangle to a knitted cotton fabric and to a woven cotton/polyester blend fabric in accordance with the details from table 2.
Performance Tests:

For textile finishing, a bleached, unfinished woven PES/CO 65/35 twill fabric with a basis weight of 215 g/m$^2$, and also unfinished 100% CO interlock knitted fabric with a basis weight of 190 g/m$^2$, were used.

Serving as a reference was a finish with a 40% standard silicone softener emulsion (macroemulsion of an amino-functional polydimethylsiloxane) available commercially from WACKER CHEMIE AG under the trade name FINISH CT 78 E, and also fabric padded with water and dried (=control).

The fabric was impregnated with the respective liquor, squeezed off with a two-roll pad mangle, stretched out, and dried in a MATHIS laboratory tenter frame at 150° C. for three minutes (see table 2). The fabric was subsequently conditioned for at least 12 hours in a conditioning chamber at 23° C. and 62% atmospheric humidity.

TABLE 2

| Type of textile | Cotton knit (interlock) (100% CO) | Woven cotton/polyester blend fabric (65 PES/35 CO) |
|---|---|---|
| Liquor pick up (4 m/min; 4 bar) | 77% | 46% |
| Drying and condensing | 3 min; 150° C. | 3 min; 150° C. |

Methods of Determination for the Results of the Use Examples:
Determination of Softness (Hand Evaluation):

Since the softness of textiles is greatly dependent on the subjective perception of the testers, only the boundary conditions, but not the evaluation, can be standardized. To ensure reproducibility nonetheless, the finished specimens were assessed and ranked in terms of their softness. For this purpose, four testers awarded points depending on the number of specimens tested, with the level of the point number correlating to the softness. The softest specimen receives the maximum point number, while the least soft specimen receives 0 points. The hand evaluation for a specimen is therefore calculated as the average value of the points scored by this particular specimen.

Determination of Droplet Absorption Time:

Following application of the silicone product, the finished specimen was stored for eight hours for acclimatization in a conditioning chamber at a temperature of 23° C. and an atmospheric humidity of 62%, and then a droplet of deionized water was placed on the taut fabric surface from a height of 1 cm, and a determination was made of the time taken for the fabric to absorb the water droplet—but no longer than three minutes (180 seconds).

Five determinations were carried out, and the results were averaged.

Determination of Yellowing:

The degree of yellowing was ascertained using a spectro guide sphere Gloss® colorimeter (BYK GARDNER, Geretsried, Germany). The textile sample in this case is measured at three different points, and the average is found. This "average yellowing b+" is compared with the untreated sample.

Smaller b+ values denote decreasing yellowing.

Table 3 assembles the results, for a number of use examples, of the fabric finished by padding methods.

TABLE 3

| Examples and comparative | Solids content in [%] | Amount used in [g/l] | Average yellowing + b value | Droplet test, cotton knit in [s] | Droplet test, cotton/-polyester blend woven in [s] | Softness, cotton knit | Softness, cotton/polyester blend woven |
|---|---|---|---|---|---|---|---|
| FINISH CT 78E | 40 | 19.0 | 1.45 | >180 | >180 | 5 | 4 |
| Ex. 9 | 30 | 25.0 | 1.27 | 4 | 12 | 3 | 2 |
| Ex. 10 | 30 | 25.0 | 1.34 | 9 | 20 | 5 | 5 |
| Ex. 11 | 30 | 25.0 | 1.28 | 5 | 32 | 6 | 5 |
| Ex. 12 | 30 | 25.0 | 1.30 | 6 | 15 | 4 | 4 |
| Ex. 13 | 30 | 25.0 | 1.31 | 3 | 12 | 2 | 2 |
| Control | | | 1.20 | 0 | 2 | 0 | 0 |

The textiles finished with the silicone copolymers of the invention yellow less in comparison to the comparative product (FINISH CT 78 E), are hydrophilic, and have a soft hand.

The invention claimed is:

1. A silicone copolymer (A) of the formula (I)

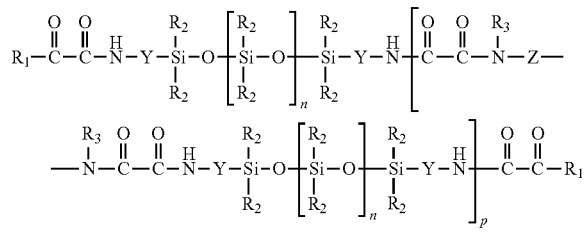

where
Y is identical or different and denotes a divalent hydrocarbon radical which has 1 to 20 carbon atoms, optionally containing one or more heteroatoms,
Z is identical or different and denotes a divalent organic radical which contains a polyoxyalkylene group,
$R^1$ is identical or different and is a radical of the formula $$—N(R^4)—R^5 \quad (IV'),$$

$R^2$ is identical or different and denotes a monovalent hydrocarbon radical which has 1 to 18 carbon atoms, optionally containing halogen or oxygen atoms,
$R^3$ is identical or different and is a hydrogen atom or a monovalent hydrocarbon radical having 1 to 20 carbon atoms,
$R^4$ denotes a hydrogen atom, a $C_{1-18}$ alkyl radical, or a hydrocarbon radical which has 4 to 18 carbon atoms and contains one or more oxygen or nitrogen atoms, and
$R^5$ denotes a $C_{1-18}$ alkyl radical, or a hydrocarbon radical which has 4 to 18 carbon atoms and contains one or more oxygen or nitrogen atoms,
or $R^4$ and $R^5$ in formula (IV') together denote a divalent hydrocarbon radical which optionally contains one or more oxygen or nitrogen atoms,
$R^6$ is identical or different and denotes a $C_1$-$C_{10}$ alkylene radical, and
$R^7$ denotes a $C_1$-$C_{10}$ alkylene radical,
n is an integer from 10 to 2000,
p is an integer from 1 to 5, and
w is on average 2.5 to 80.

2. The silicone copolymer of claim 1, wherein
Y is identical or different and denotes a divalent hydrocarbon radical which has 1 to 20 carbon atoms, optionally containing oxygen or nitrogen atoms,
Z is identical or different and denotes a divalent organic radical which contains a radical of the formula —($R^6$O)$_w$—$R^7$—,
$R^1$ is identical or different and is a radical of the formula $$—N(R^4)—R^5 \quad (IV'),$$

$R^2$ is identical or different and denotes a monovalent hydrocarbon radical which has 1 to 18 carbon atoms, optionally containing halogen or oxygen atoms,
$R^3$ is identical or different and is a hydrogen atom or a monovalent hydrocarbon radical having 1 to 20 carbon atoms,
$R^4$ denotes a hydrogen atom, a $C_{1-18}$ alkyl radical, or a hydrocarbon radical which has 4 to 18 carbon atoms and contains one or more oxygen or nitrogen atoms, and
$R^5$ denotes a $C_{1-18}$ alkyl radical, or a hydrocarbon radical which has 4 to 18 carbon atoms and contains one or more oxygen or nitrogen atoms,
or $R^4$ and $R^5$ in formula (IV') together denote a divalent hydrocarbon radical which optionally contains one or more oxygen or nitrogen atoms,
$R^6$ is identical or different and denotes a $C_2$-$C_3$ alkylene radical, and
$R^7$ denotes a $C_2$-$C_3$ alkylene radical,
n is an integer from 10 to 300,
p is an integer from 1 to 2, and
w is on average 10 to 30.

3. The silicone copolymer of claim 1, wherein Y is a 1,3-propylene radical.

4. A process for preparing a silicone copolymer of claim 1, comprising:
reacting
(1) organopolysiloxanes terminated with oxamidoester groups, of the formula (II)

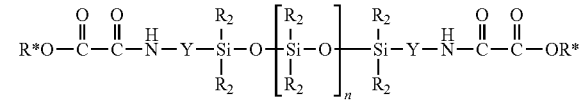

wherein R* is a monovalent hydrocarbon radical having 1 to 18 carbon atoms, or is a radical $R^5$,
with
(2) polyetheramines of the formula $$R^3HN—Z—NHR^3 \quad (III),$$

and with
(3) primary or secondary amines of the formula $$H—N(R^4)—R^5 \quad (IV).$$

5. The process of claim 4, wherein polyetheramines (2) are used in amounts of 0.3 to 0.8 mol of amino groups in (2) per mole of oxamidoester groups in organopolysiloxane (1).

6. The process of claim 4, wherein primary or secondary amines (3) are used in amounts of 0.2 to 0.7 mol of amino groups in (3) per mole of oxamidoester groups in organopolysiloxane (1).

7. An aqueous emulsion comprising:
   at least one silicone copolymers (A) as claimed in claim 1, at least one emulsifier (B) and/or coemulsifier (B'), and
   water (C).

* * * * *